No. 812,035. PATENTED FEB. 6, 1906.
J. W. FRANKLIN.
NUT LOCK.
APPLICATION FILED MAY 5, 1905.
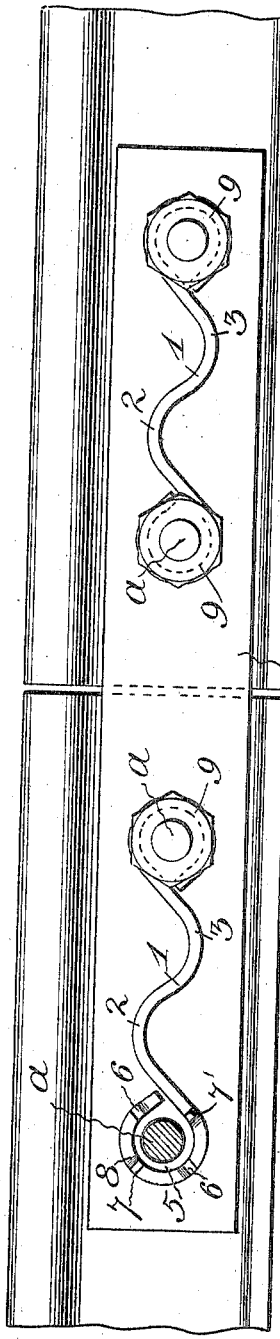
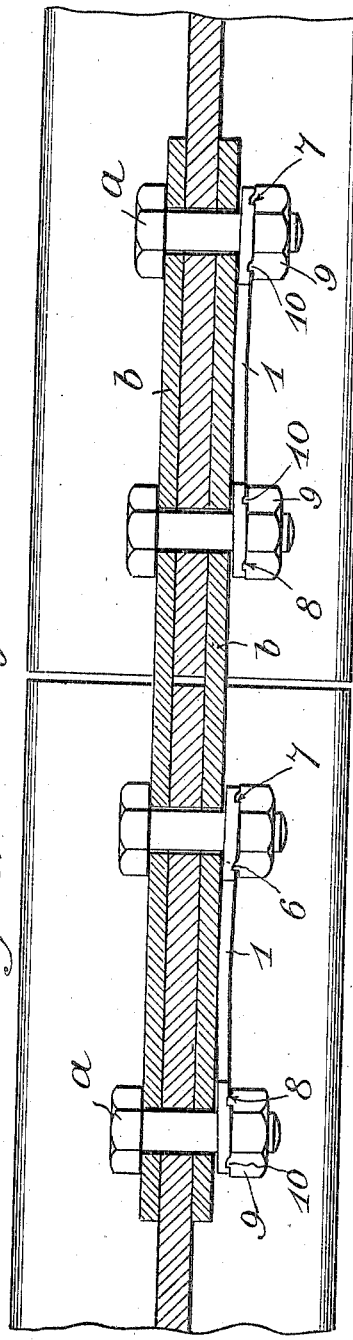
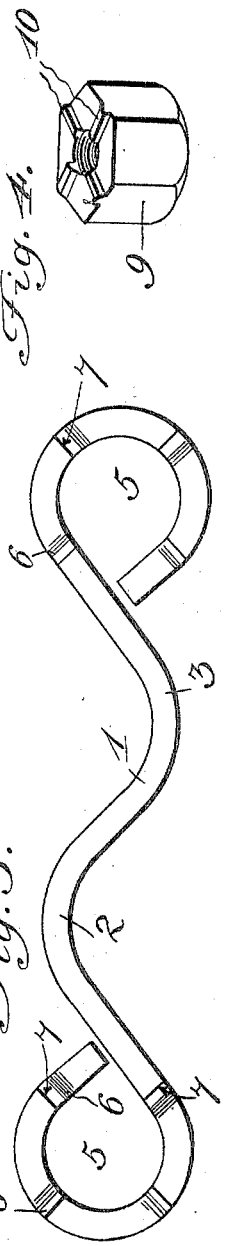
Witnesses
C. Munter
C. H. Griesbauer
Inventor
J. W. Franklin
by H. B. Wilson
Attorney

UNITED STATES PATENT OFFICE.

JAMES W. FRANKLIN, OF BOSTON, GEORGIA.

NUT-LOCK.

No. 812,035.     Specification of Letters Patent.     Patented Feb. 6, 1906.

Application filed May 5, 1905. Serial No. 258,944.

*To all whom it may concern:*

Be it known that I, JAMES W. FRANKLIN, a citizen of the United States, residing at Boston, in the county of Thomas and State of Georgia, have invented certain new and useful Improvements in Nut-Locks; and I do declare the following to be a full, clear, and exact description of the invention, such as will enable others skilled in the art to which it appertains to make and use the same.

My invention is an improved nut-lock, especially adapted for use on railways for locking the nuts on the bolts employed at the rail-joints; and it consists in the construction, combination, and arrangement of devices hereinafter described and claimed.

In the accompanying drawings, Figure 1 is an elevation, partly in section, of a railway-rail joint provided with nut-locking devices embodying my improvements. Fig. 2 is a horizontal sectional view of the same. Fig. 3 is a detail elevation of the nut-locking spring-washer, and Fig. 4 is a detail perspective view of one of the nuts.

In the embodiment of my invention I provide a spring-washer 1, made of steel or other suitable spring metal and preferably in the form of a rod, as here shown, having its intermediate portion bent reversely, as at 2 3, and having its end portions curved oppositely to form openings 5, through which the bolts *a* extend. The said spring bears against the outer side of one of the fish-plates *b*, and its end portions which are concentric with the bolts are provided in their outer sides with notches 6, each of which has one side formed by an abrupt shoulder 7 and the other side inclined, as at 8.

Each of the nuts 9, which are otherwise of the usual construction, is provided on its inner side with projections 10, which register with and engage the notches 6 in the ends of the spring-washer. The intermediate portion of the latter bears against the fish-plate, and its end portions spring outwardly from the fish-plate, so that as the nuts are secured onto the bolts they force the ends of the spring-washer toward the fish-plate, and their projections 10 engage the notches in the said spring-washer, the said notches and projections coacting to lock the nuts against reverse rotation, so that they cannot possibly become casually detached from the bolts.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described nut-lock, consisting of the spring-washer made from a rod 1 of steel and having its intermediate portion bent reversely, as at 2, 3 and having its end portions oppositely curved to form the openings 5 for the bolts *a*, said oppositely-curved portions being provided with notches 6, said notches each having an abrupt shoulder 7 and an inclined portion 8, in combination with the bolts *a* and nuts 9, said nuts each having upon their inner face projections 10 which register with and engage the notches 6, said projections each having an inclined face and an abrupt shoulder to engage and fit the notches 6, essentially as described.

In testimony whereof I have hereunto set my hand in presence of two subscribing witnesses.

JAMES W. FRANKLIN.

Witnesses:
J. W. TAYLOR,
J. M. RUSHIN.